July 12, 1966  F. H. REED  3,259,956
MACHINE FOR APPLYING SUSPENSION LOOPS TO THE
ELECTRODES USED IN ELECTROLYTIC OPERATIONS
Filed Jan. 21, 1964  11 Sheets-Sheet 11

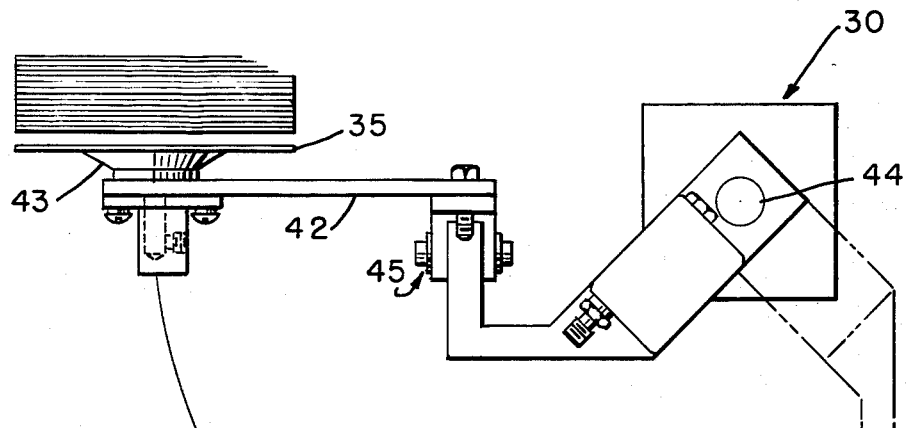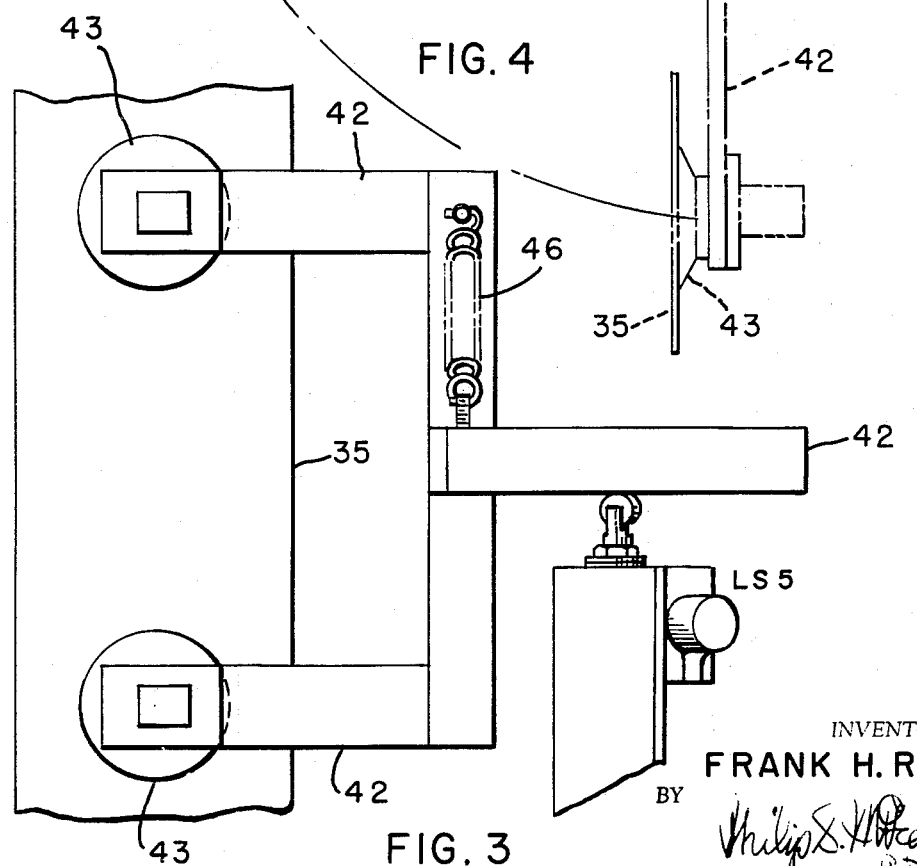

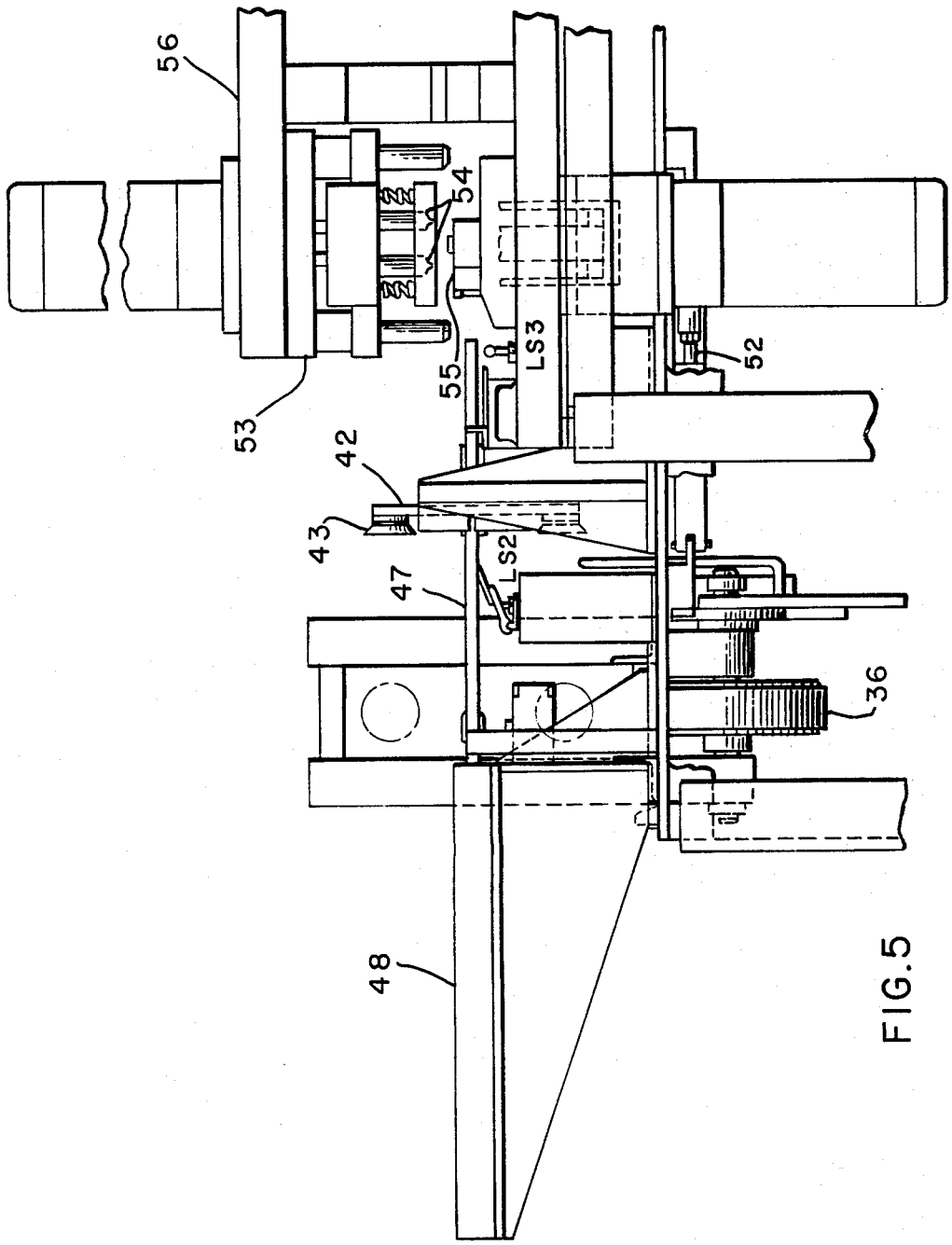

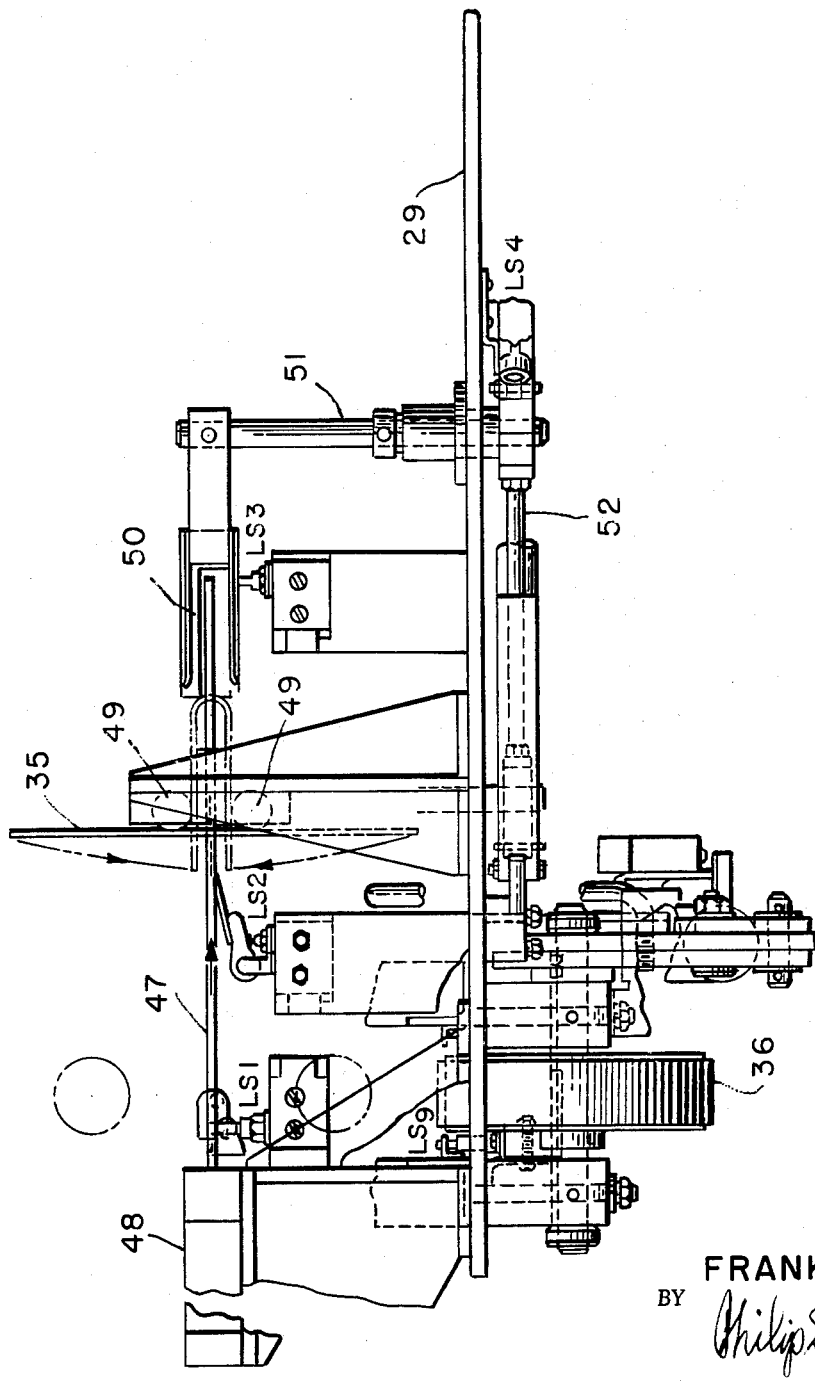

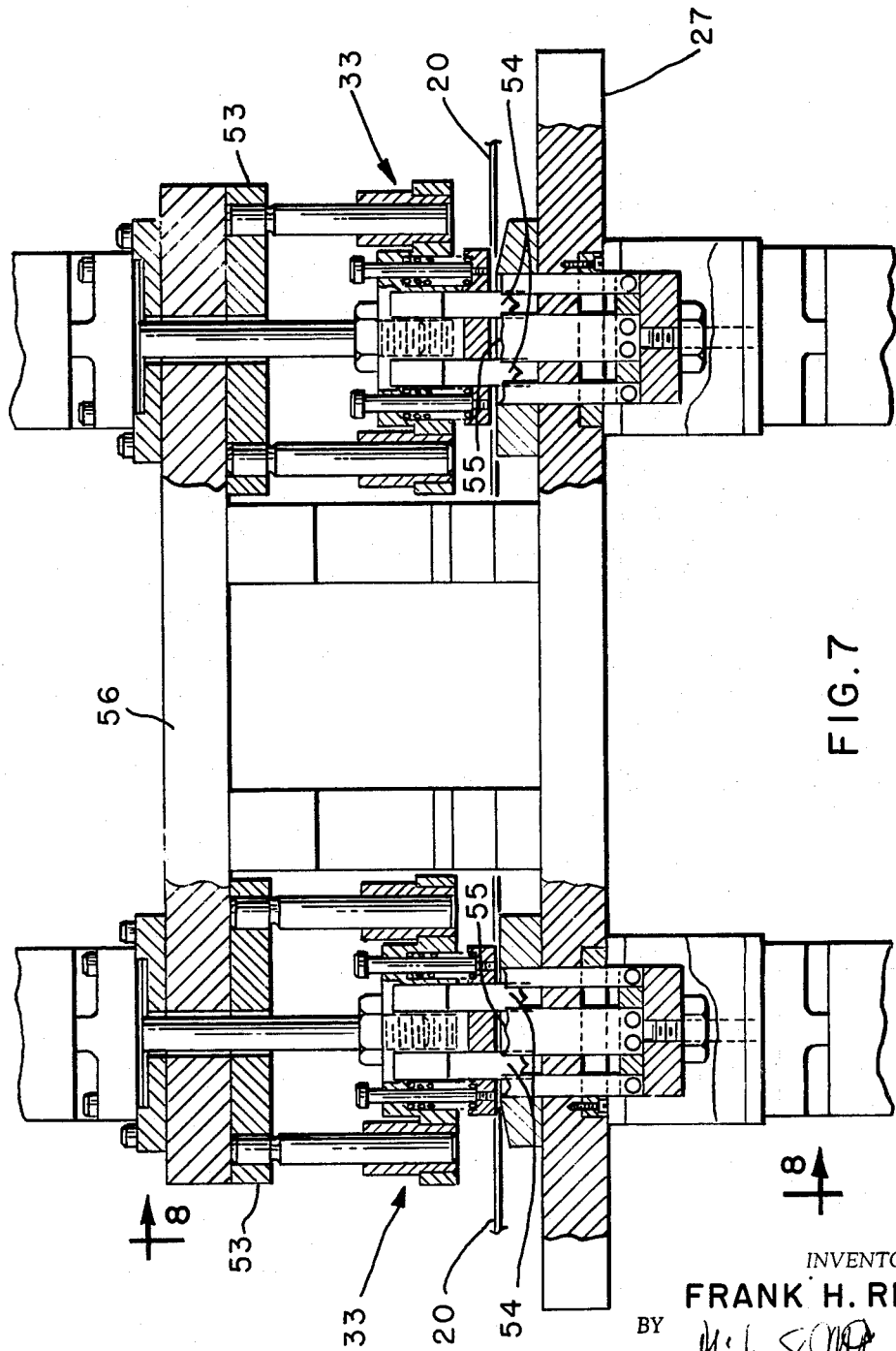

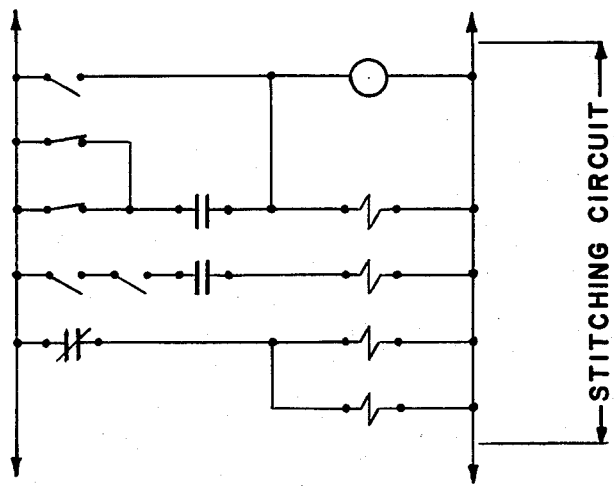
FIG. 15
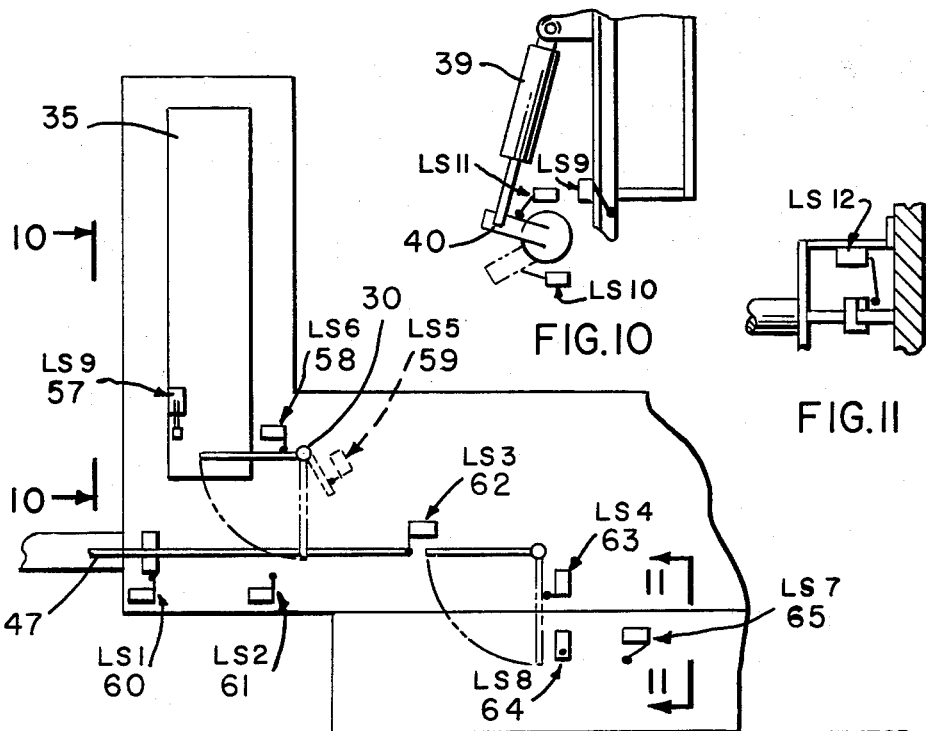
FIG. 10
FIG. 11
FIG. 9
INVENTOR.
FRANK H. REED

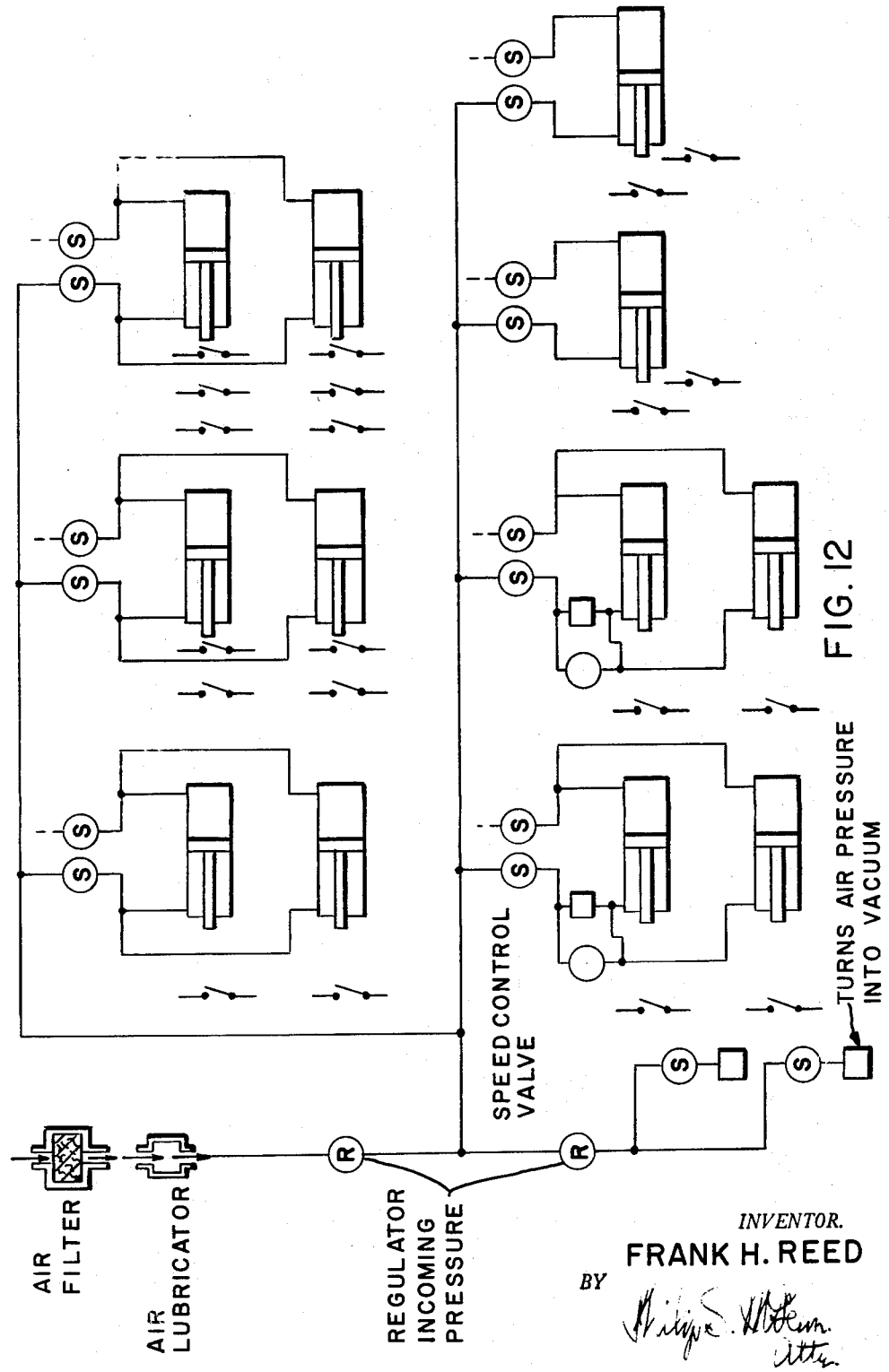

INVENTOR.
FRANK H. REED
BY

United States Patent Office 3,259,956
Patented July 12, 1966

3,259,956
MACHINE FOR APPLYING SUSPENSION LOOPS TO THE ELECTRODES USED IN ELECTROLYTIC OPERATIONS
Frank H. Reed, Linden, N.J., assignor to Service Machine Company, Elizabeth, N.J., a corporation of New Jersey
Filed Jan. 21, 1964, Ser. No. 339,287
3 Claims. (Cl. 29—282)

The invention herein disclosed is a machine for applying suspension loops to the electrode plates used in electrolytic refining, electroplating and other electrolytic operations.

Objects of the invention have been to provide practical and efficient mechanism for shaping conducting strips into the form of open loops, positioning the open ends of the loops over the plates which are to form the electrodes and then forcing integral portions of the loops into and through the material of the plates with a mechanical "stitching" and riveting effect.

Further special objects of the invention have been to accomplish these results automatically, at low cost and at a reasonably high production rate.

The foregoing and other desirable objects have been attained by a novel combination of devices cooperating to take prepared strips from supply magazines, bend the strips into U clip formation, then place these clips over the edges of properly positioned plates and finally drive portions of the clip material through the plates and clinch the protruding portions of the clip material at the far side of the plates.

Other novel features of the invention and desirable objects attained are set forth and will appear in the course of the following specification.

The drawings accompanying and forming part of the specification illustrate a presently preferred form of the invention but it is to be understood that structure may be modified and changed as regards the immediate illustration, all within the true intent and scope of the invention as hereinafter defined and claimed.

FIG. 1 in the drawings is a top plan view of the machine.

FIG. 3 is a broken front elevation on an enlarged scale of one of the transfer devices for taking the strips from the magazines and carrying them to the bending devices. This view appearing as on line 3—3 of FIG. 2.

FIG. 4 is a plan and somewhat diagrammatic view of this strip transfer device.

FIG. 5 is a broken front elevation of the machine on substantially the plane of line 5—5 of FIG. 1.

FIG. 6 is a broken front elevation, illustrating operation of the transfer device in carrying the strip to the clip forming bending mechanism.

FIG. 7 is a broken sectional view of the punching and clinching dies as on substantially the plane of line 7—7 of FIG. 1.

FIG. 9 is a diagrammatic view of the electrical controls governing operation of the transfer of strips from the magazines to the bending or forming means.

FIGS. 10 and 11 are broken fragmentary details of control devices taken on substantially the planes of lines 10—10 and 11—11 of FIG. 9.

FIGS. 12, 13, 14, 15 are diagrammatic views of the electrical and air control systems.

Figure 16:
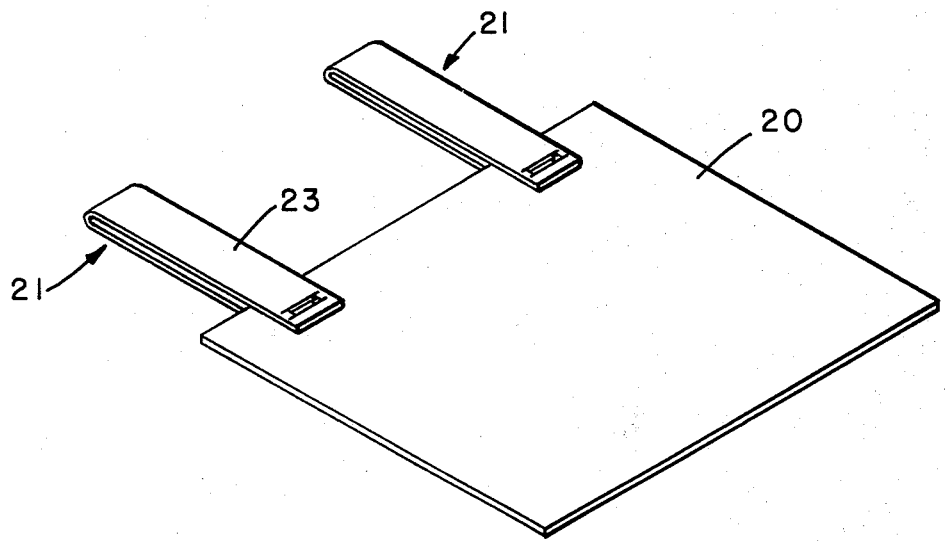

FIG. 16 is a perspective view of one of the completed electrode plates with hanger loops attached.

Figure 17:
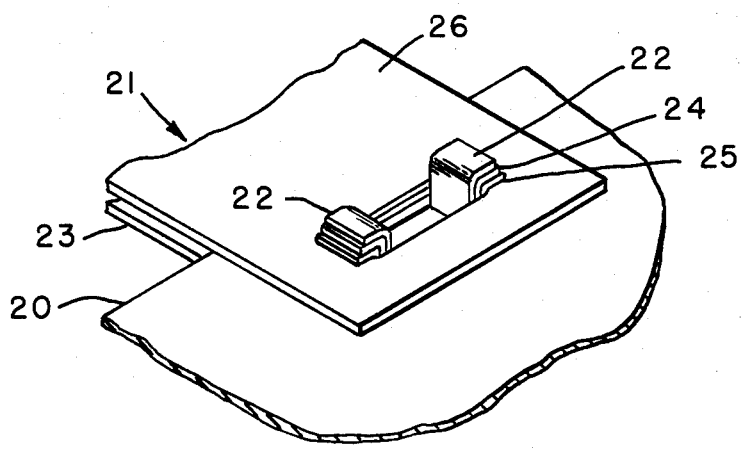

FIG. 17 is a broken sectional detail of one of the completed integral joint connections betwen hanger and plate.

FIG. 16 illustrates the final product of the machine as a sheet metal plate 20, of copper, for example, with suspension loops 21, of the same metal attached over one edge of the plate.

FIG. 17 shows how attachment is effected by driving lugs or tongues 22, from one arm 23, of the hanger through the plate and over lugs 24, 25, struck from the plate and from the other arm 26, of the hanger.

These attachment lugs as shown in FIG. 17, are arranged in opposing stands, headed over at their projecting ends and forming integral rivets clinching the parts together in fixed firm conducting engagement.

Figure 1:
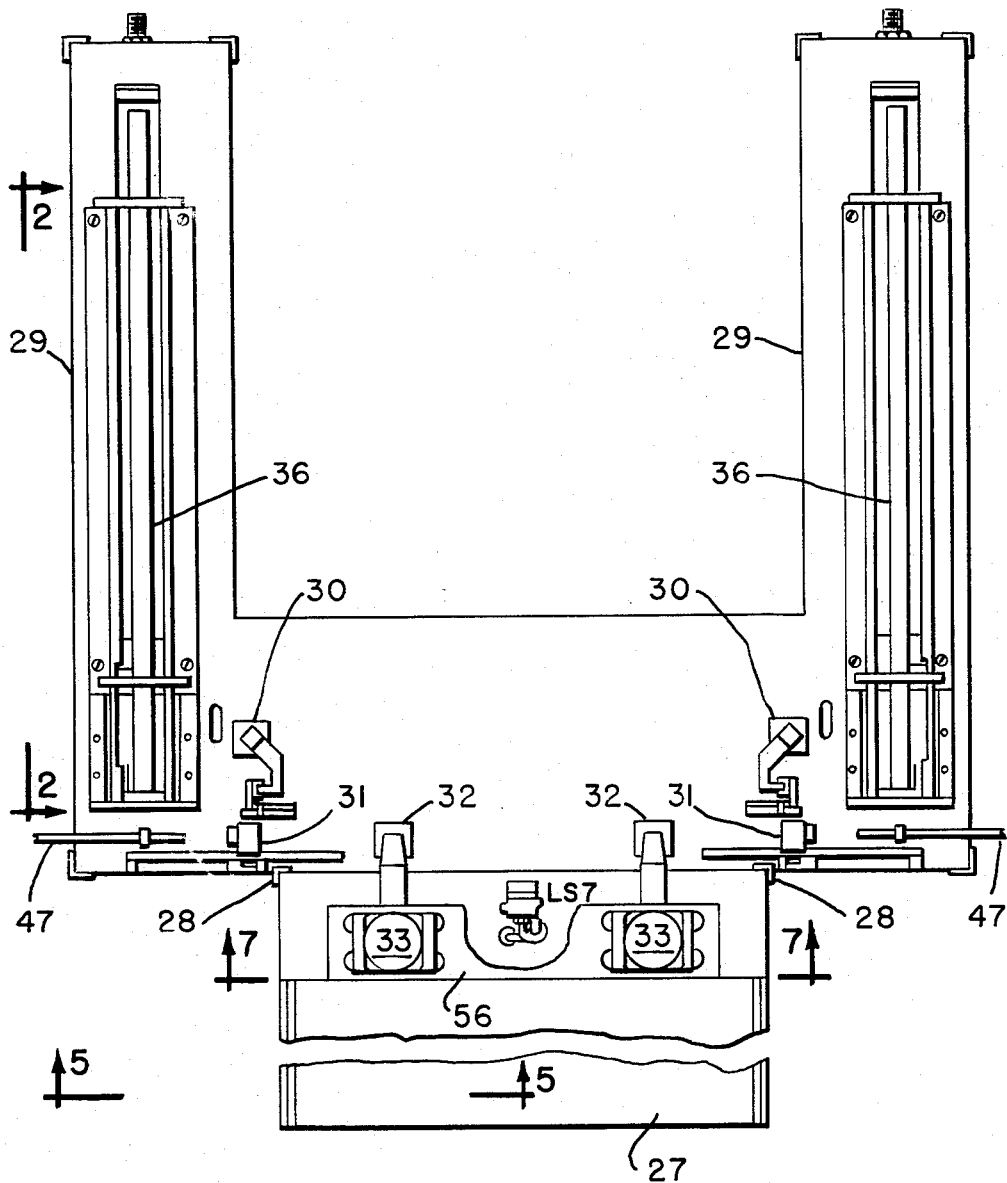

In the plan view FIG. 1, the machine is shown as comprising a work table 27, on which the plate is supported and positioned by front gages or stops 28, with magazines 29, for hanger forming strips, leading up to opposite sides of the table and transfer devices 30, for carrying the strips from the magazines to devices 31, which bend the strips into the form of U-shaped clips and carriers 32, which take the clips from the benders and swing them into position over the edge of the plate, beneath the presses 33, which punch the attachment lugs through the plate and in effect "stitch" the hangers to the plate.

Figure 2:
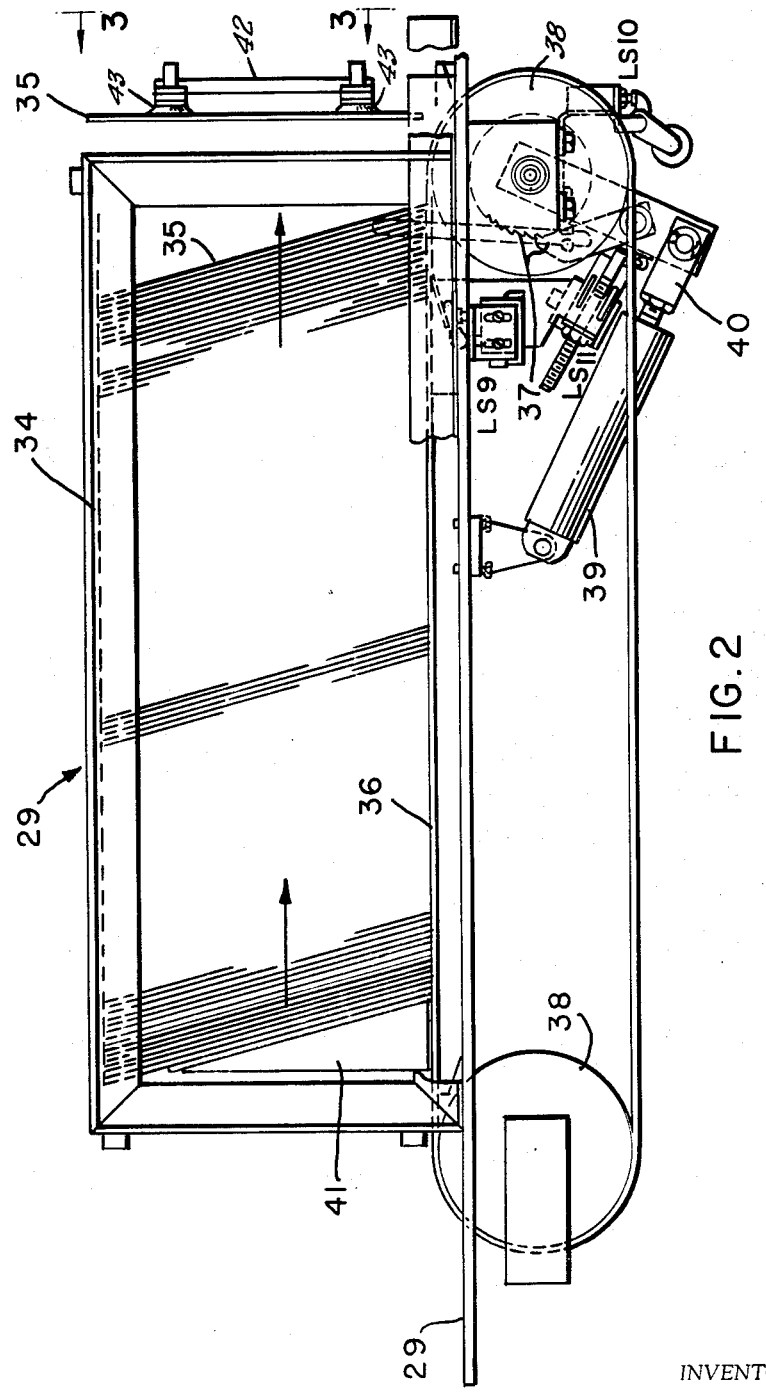
FIG. 2 is a side elevation of one of the strip holding magazines on substantially the plane of line 2—2 of FIG. 1.

The strip feeding magazines are shown in FIG. 2 as consisting in each case of an open guideway 34, for the flat strips 35, which are to form the hanger loops, closed at the bottom by a belt 36, on which the strips are supported and which is intermittently advanced by pawl and ratchet mechanism 37, connected with one of the pulleys 38, carrying the belt.

This intermittent feed action is shown as effected by an air cylinder 39, connected at 40, with the ratchet mechanism.

FIG. 2 shows the hanger forming strips 35, resting on an incline on the feed belt 36, against an inclined rest or block 41, carried by the belt.

The open top construction of the guideways 29, enables the magazines to be quickly and easily filled as required, by simply placing a stack or any number of strips on the belt ahead of the feed block 41. The latter may have a releasable connection with the belt, so that it may be returned to a start position after feeding a full stack of the strips.

The first transfer devices 30, are shown in FIGS. 3 and 4, as consisting in each instance, of an arm 42 carrying spaced suction cups 43, engageable with the front hanger strip, this arm being carried by an upright rock shaft 44, and being pivotally jointed at 45, enabling a pivotal action to engage both suction cups with the inclined front strip and return of the cups to a vertical position under impulse of spring 46, FIG. 3.

In FIG. 4, the broken lines indicate the swinging travel of the suction cups required to take the first strip off a stack and to swing it into position over the mechanism which bends the strip into the formation of a U-clip.

The bender is shown in FIGS. 5 and 6, as consisting of a rod 47, which is projected by an air cylinder 48, to engage the center portion of the flat strip 35, and to drive it between vertically spaced rolls 49, thus to convert it to U-clip formation as indicated in the broken lines and to force this clip into the grip of a carrier 50, shaped to receive the clip and carried by an upwardly extending oscillating shaft 51.

The latter shaft as shown in FIG. 6, is rocked by connections 52, to swing the pocket holding the clip from the bender station laterally into position with the arms of the clip embracing the edge of the plate on the work table.

Figure 8:
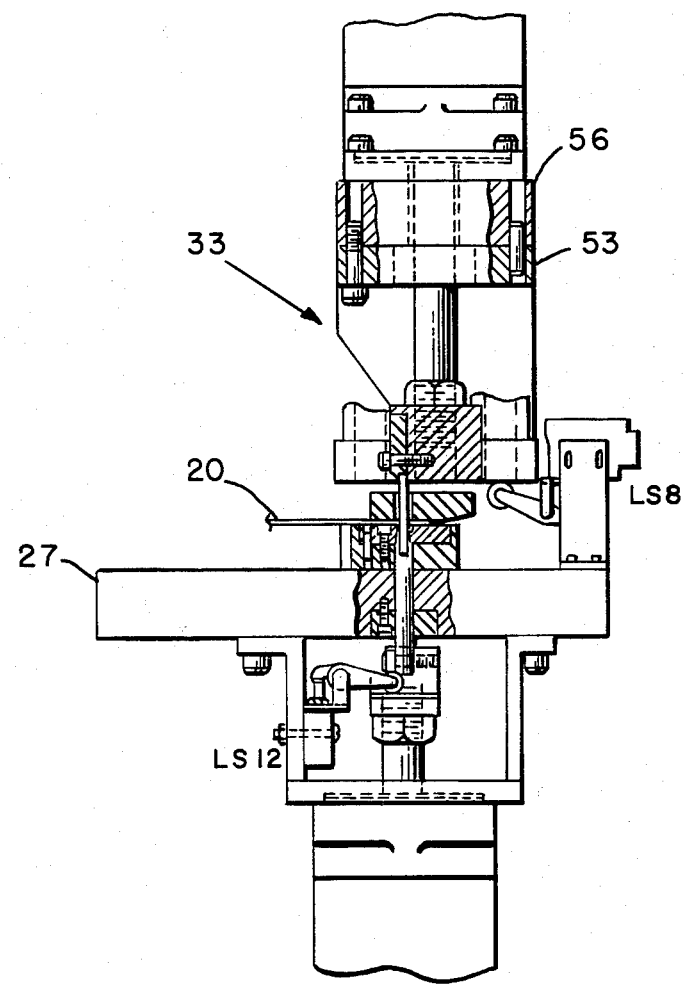
FIG. 8 is a broken sectional detail on substantially the plane of line 8—8 of FIG. 7.

FIGS. 7 and 8 illustrate the construction of the punch presses for connecting the preformed hanger loops with the plate.

These consist in each instance of an upper press head 53, carrying dies 54, cooperating with a lower set of dies 55, to strike the lugs 22, 24, 25, of the clips and plates through the plates and to flatten them down in overstanding relation as shown in detail in FIG. 17.

The two press heads are shown in FIG. 7 as connected together by a bar 56, causing them to operate simultaneously on the two clips presented over the edge of the electrode plate.

Controls are provided to effect the step-by-step operations described.

Thus in FIG. 9, there is indicated a control 57, engageable by the front strip 35, in the magazine to set the transfer device 30, ready for action, controls 58, 59, governing pick-up and transfer movements of this device and the starting of the strip bender 47, controls 60, 61, for this strip bender and controls 62, 63, governing operation of the clip transfer device and controls 64, 65, governing starting and stoppage of the clinching press.

Detail positioning and operation of these control devices are shown in FIGS. 10 and 11.

A simplified diagram of the pneumatic devices for operating corelated elements of the machine is shown in FIG. 12.

Figure 13:
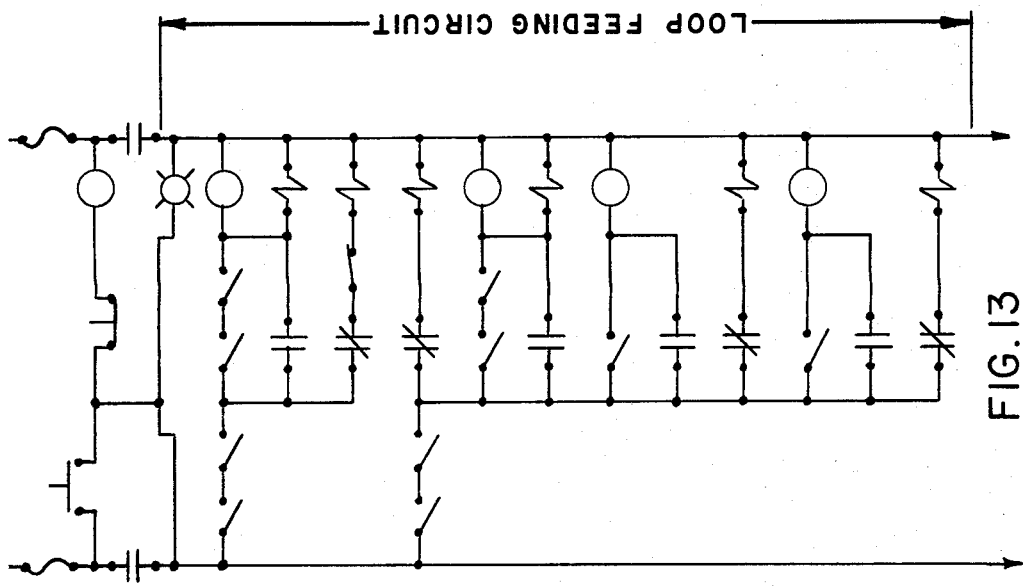

FIG. 13 shows in simplified form a wiring diagram of the loop or clip feeding mechanism.

Figure 14:
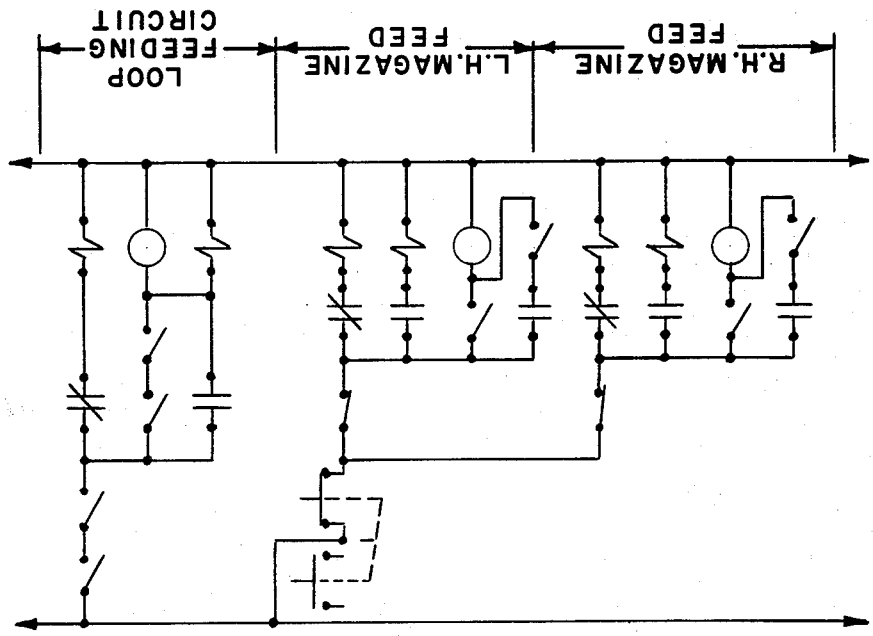

FIG. 14 is a wiring diagram for the right hand magazine feed, left hand magazine feed and the loop feeding circuit.

FIG. 15 is a simplified circuit for the stitching mechanism.

Actuation of the several corelated devices and in the order described is effected by electrically controlled air cylinders connected to operate successively in properly timed relation as indicated in the drawings.

What is claimed is:

1. A machine for forming and applying suspension loops to electrode plates, comprising the combination of
    means for locating an electrode plate in a definite position,
    a magazine for feeding a stack of loop forming strips to a definite location,
    forming means for bending individual strips into U clip formation,
    a first transfer device for transferring the top strip in said magazine to said forming means,
    a second transfer device positioned to receive the bent clips from said forming means and to transfer a received clip into position over the edge of said definitely positioned plate,
    a stitching die for driving portions of the thus located clip through said plate and for upsetting protruding portions of said strip at the far side of the plate, and
    means for effecting cooperative operation of the foregoing in the timed relation described.

2. A machine for forming and applying a pair of suspension loops in spaced relation to electrode plates, comprising
    means for locating an electrode plate in a definite position,
    a magazine for feeding a stack of loop forming strips to a definite location,
    forming means for bending individual strips into U clip formation,
    a first transfer device for transferring the top strip in said magazine to said forming means,
    a second transfer device positioned to receive the bent clips from said forming means and to transfer a received clip into position over the edge of said definitely positioned plate,
    a stitching die for driving portions of the thus located clip through said plate and for upsetting protruding portions of said strip at the far side of the plate.
    a second set of the aforesaid devices for forming and applying second suspension loops to the same electrode plates, disposed in spaced apart relation to said first mentioned devices, and
    means for effecting cooperative operation of all said devices in the timed relation described.

3. A machine for forming and applying suspension loops to electrode plates, comprising the combination of
    means for supporting an electrode plate in a definite position,
    means for forming strip material into U-shaped clips,
    means for positioning said clips over the edge of said positioned plate with the spaced arms of the clips over opposite sides of the plate and
    means for driving material of the thus positioned clips through the material of the plate and clinching the driven material over the plate material.

References Cited by the Examiner

UNITED STATES PATENTS

| | | | |
|---|---|---|---|
| 2,020,408 | 11/1935 | Fruth | 29—25.1 |
| 2,865,451 | 12/1958 | Ihrig | 20—21.1 |

RICHARD H. EANES, JR., *Primary Examiner.*